Sept. 17, 1968  F. A. NELSON  3,402,345
FIELD MODULATED GYROMAGNETIC RESONANCE SPECTROMETER
HAVING AN INTERNAL TEST SIGNAL GENERATOR
Filed April 7, 1966
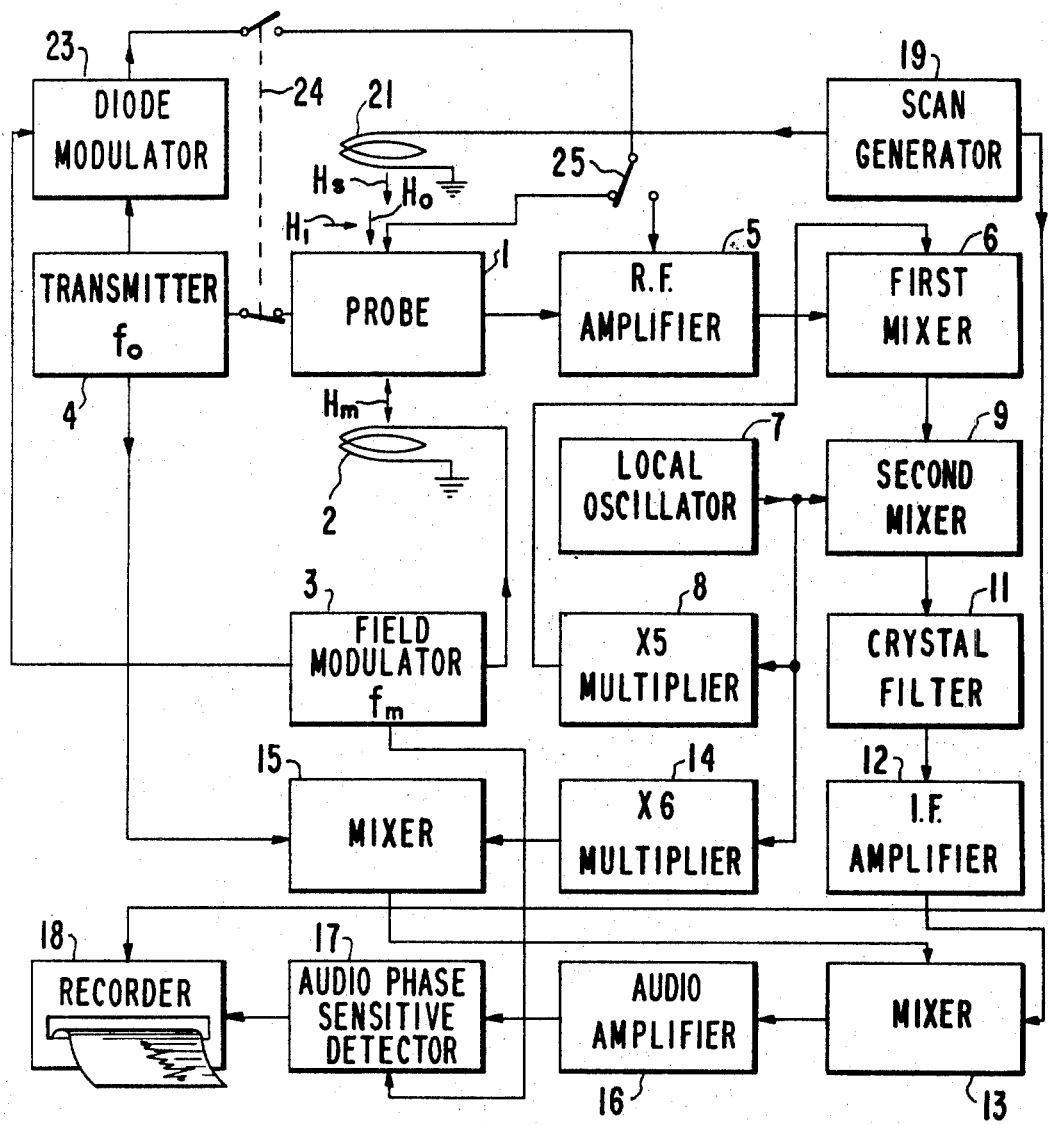
FIG.2
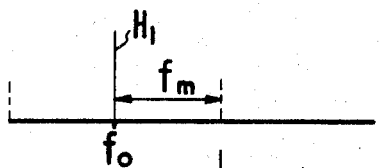
FIG.1A
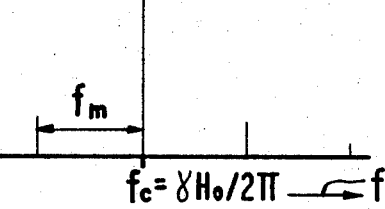
FIG.1B
INVENTOR.
FORREST A. NELSON
ATTORNEY United States Patent Office 3,402,345
Patented Sept. 17, 1968

3,402,345
FIELD MODULATED GYROMAGNETIC RESO-
NANCE SPECTROMETER HAVING AN IN-
TERNAL TEST SIGNAL GENERATOR
Forrest A. Nelson, Palo Alto, Calif., assignor to Varian
Associates, Palo Alto, Calif., a corporation of California
Filed Apr. 7, 1966, Ser. No. 541,011
10 Claims. (Cl. 324—.5)

The present invention relates in general to gyromagnetic resonance spectrometers and, more particularly, to an improved D.C. field modulated type spectrometer having an internal test signal generator for supplying a test signal useful for testing alignment and operation of the spectrometer.

Heretofore D.C. field modulated gyromagnetic resonance spectrometers have been built. In these spectrometers resonance of the gyromagnetic bodies, such as protons, is excited in a D.C. magnetic field by the combined action of an audio frequency modulation of the D.C. field and an applied radio frequency field at a frequency displaced from the resonance frequency by the certain audio field modulation frequency. This field modulated spectrometer has several advantages over prior spectrometers which have had an applied R.F. magnetic field component at the gyromagnetic resonance frequency. These advantages generally accrue because, in the field modulated spectrometer, the transmitter frequency is displaced in frequency from the gyromagnetic resonance frequency. Thus, the gyromagnetic resonance frequency may be detected while rejecting the leakage transmitter signals enering into the resonance receiver circuitry.

However, one problem is encountered in this improved type of spectrometer. The problem is that there is no detected output signal from the receiver in the absence of resonance of the gyromagnetic bodies. Due to the high resolution of the spectrometer it is often difficult to locate a resonance line, assuming the spectrometer receiver is properly aligned and operating properly. Thus, failure to observe a resonance output signal could be due to an inadequate search for a resonance of the substance under analysis or it could be due to a failure or improper adjustment of the receiver channel. Although a separate test signal generator could be employed to inject a simulated resonance signal, such a signal generator would be complex and costly due to the high degree of stability and precision required for such a test signal generator.

In the present invention, a simple test signal generator, employing parts in common with the spectrometer, provides a simulated resonance signal, whereby the receiver channel may be tested and properly aligned.

The principal object of the present invention is the provision of an improved gyromagnetic resonance spectrometer.

One feature of the present invention is the provision of a field modulated spectrometer having an internal test signal generator, which employs parts in common with the standard parts of the field modulated spectrometer, whereby all the spectrometer's amplifier channels may be readily aligned and tested.

Another feature of the present invention is the same as the preceding feature wherein the test signal generator includes a modulator, preferably an amplitude modulator, for modulating the transmitter frequency with a modulation frequency corresponding to or derived from the D.C. field modulation frequency of the spectrometer to produce a simulated resonance signal which is injected into the receiver channel.

Another feature of the present invention is the same as any one or more of the preceding features wherein the test signal is variable in frequency for testing the response of the receiver filter circuits.

Other features and advantages of the present invention will become apparent upon a perusal of the following specification taken in connection with the accompanying drawings wherein:

FIG. 1A is an amplitude versus frequency spectrum diagram of an amplitude modulated transmitter signal, FIG. 1B is an ampliude versus frequency spectral line diagram of the frequency modulated gyromagnetic resonance signal, and FIG. 2 is a block diagram of a gyromagnetic resonance spectrometer employing features of the present invention.

Referring now to FIG. 2, a gyromagnetic resonance substance such as, for example, the protons of water is placed within a conventional probe 1 and immersed in a polarizing D.C. magnetic field $H_0$, as of 58 kg., produced by a magnet such as a superconducting solenoid, not shown. The gyromagnetic bodies will have a resonance frequency $f_c = \gamma H_0/2\pi$, where $\gamma$ is the gyromagnetic ratio for the protons and $H_0$ is the D.C. polarizing magnetic field intensity. For protons in a field of about 58 kg., $f_c$ can be 250.010 mHz.

In a field modulated type spectrometer, the D.C. field is modulated by a superimposed modulating field $H_m$ applied via coil 2 at a convenient audio frequency $f_m$, as of from 1 kHz. to 100 kHz. and preferably 10 kHz., obtained from a field modulator 3. A transmitter 4 applies an A.C. magnetic field $H_1$ to the bodies at right angles to the direction of the polarizing magnetic field $H_0$. The transmitter frequency $f_0$ is displaced in frequency, by the D.C. field modulation frequency $f_m$, from the gyromagnetic resonance frequency $f_c$ at, for example, 250.010 mHz. Under these conditions frequency modulated resonance of the gyromagnetic bodies is obtained.

The F.M. resonance signal emanating from the resonant bodies will have a typical F.M. spectrum as shown in FIG. 1B. The sidebands have relatively small amplitudes as compared to the carrier resonance component at $f_c$. Their amplitudes correspond to their respective Bessel functions of the D.C. field modulation index M and since the carrier component is to be detected the modulation index M is made small, i.e., usually less than 1.0 and preferably within the range of 0.1 to 0.3 thus concentrating the resonance signal amplitude in the carrier component at $f_c$.

The F.M. resonance signal, emanating from the gyromagnetic bodies, is picked up by a conventional receiver coil structure inside the probe 1 and forming the input of a radio frequency amplifier 5. The output of the amplifier 5 is fed to a first mixer 6 wherein it is mixed with a local oscillator signal at, for example, 204.175 mHz. to produce a first intermediate frequency of 45.835 mMz. The first local oscillator signal at 204.175 mHz. is produced by multiplying a local oscillator signal at 40.835 mHz. obtained from a local oscillator 7 by 5 in multiplier 8.

The output of the first mixer 6 is fed to second mixer 9 wherein it is mixed with a local oscillator signal at 40.835 mHz. to transpose the carrier resonance component to a second intermediate frequency I.F. of 5.000 mHz. The signal is then fed to a crystal type band pass filter 11 tuned to pass the signal carrier component at 5.000 mHz. and to reject all other sideband components, including the transposed I.F. transmitter component, by as much as 40–50 db. The 5 mHz. carrier resonance component is amplified in I.F. amplifier 12 and fed to a mixer 13 wherein it is mixed with a local oscillator signal at 4.990 mHz. This local oscillator signal is displaced from the carrier resonance component by the field modulation frequency of 10 kHz. to produce an audio frequency carrier resonance component at the field modulation frequency $f_m$. This latter local oscillator signal at 4.990 mHz. is produced by multiplying the local oscillator signal derived from local oscillator 7 by 6 in 6, times multiplier 14, to obtain 245.010 mHz. This output is mixed in mixer 15 with the transmitter frequency $f_0$ at 250.000 mHz. to obtain 4.990 mHz. which is the desired local oscillator signal.

The audio frequency resonance carrier signal component is amplified in audio amplifier 16 and fed to one terminal of an audio phase sensitive detector 17. The other input to the phase sensitive detector 17 is the field modulation signal. The output of the audio phase detector is a D.C. resonance signal corresponding to the F.M. carrier resonance component of the sample under analysis. This output is recorded on recorder 18 as a function of time or field scan to obtain a resonance spectrum of the sample under analysis.

The D.C. magnetic field $H_0$ is scanned over a range wide enough to cover the expected different spectral lines of the sample under analysis. The field is scanned by superimposing a slowly varying magnetic field component $H_s$ upon the polarizing magnetic field $H_0$. The scan field $H_s$ is produced by passing a current derived from a scan generator 19 through a coil 21. A sample of the scan signal may be fed to the Y axis of the recorder 18 for recording versus the resonance output signal on the X axis.

The spectrometer of FIG. 2 thus far described and including the crystal filter 11 forms the subject matter of and is claimed in copending U.S. patent application 541,564, filed Apr. 11, 1966, and assigned to the same assignee as the present invention.

In the absence of gyromagnetic resonance of a substance in the probe 1, no signal will appear in the receiver channel beyond the output of the crystal filter 11. The absence of any signal makes it difficult to align the spectrometer and to detect the source of failures.

Therefore, a test signal is produced which simulates the resonance signal. This simulated resonance signal is produced by amplitude modulating the transmitter signal with the field modulation signal in a radio frequency diode modulator 23. Alternatively, the transmitter 4 could be directly modulated by the field modulator 3.

Amplitude modulation of the transmitter signal $f_0$ produces a pair of sidebands, as shown in dotted lines in the spectrum diagram of FIG. 1A. One of these sidebands is at $f_c$, the same frequency as the carrier gyromagnetic resonance component. The output of the diode modulator 23 is injected into the amplifier 5 of the receiver channel receiver via a ganged switch 24. The switch 24 also disconnects the transmitter 4 from the probe 1 when the test signal is injected into the amplifier 5. As an alternative, the simulated signal is injected into the receiver amplifier 5 via the receiver coil structure of the probe 1 such that tuning of the receiver coil may be tested. A switch 25 is provided for switching the simulated resonance signal into either the amplifier 5 or receiver coil.

The simulated resonance signal goes through the receiver channel just as a carrier resonance component. Thus, the receiver can be quickly and easily aligned and tested by switching to the simulated resonance signal.

The field modulator 3 is preferably made variable in frequency such that it may be tuned to produce a resonance carrier component exactly in the center of the tuned pass band of the crystal filter 11. A typical crystal filter 11 would have a center pass band frequency of 5.000 mHz. and a pass band of 10 kHz. The filter should preferably provide 40–50 db rejection outside of its pass band.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A gyromagnetic resonance spectrometer apparatus including, means for immersing a gyromagnetic resonance substance in a D.C. polarizing magnetic field of a given intensity, the substance having a certain gyromagnetic resonance frequency at the given intensity of the D.C. magnetic field, means for modulating the intensity of the D.C. polarizing magnetic field at a certain audio frequency, means for applying an A.C. magnetic field to the substance transverse to the direction of the modulated D.C. polarizing magnetic field, the frequency of the applied A.C. magnetic field being displaced from the certain resonance frequency of the substance by an amount equal to the D.C. magnetic field modulation frequency to produce frequency modulated gyromagnetic resonance of the substance, means for detecting resonance of the gyromagnetic resonance substance and for producing an output resonance signal, means for deriving an audio frequency modulated output of said A.C. magnetic field applying means to produce a simulated resonance signal, and means for applying the simulated resonance signal to said resonance detecting means to give a simulated resonance output, whereby the resonance detecting means may be tested, as desired.

2. The apparatus of claim 1 wherein said audio modulating means for producing the simulated resonance signal derives its audio modulation from said D.C. field modulator means.

3. The apparatus of claim 2 wherein said modulating means for producing the simulated resonance signal, includes means for varying the modulation frequency of the modulated signal derived from said A.C. magnetic field applying means, whereby the frequency of the simulated resonance signal is tunable for testing the filter circuits of said detecting means.

4. The apparatus of claim 2 wherein said A.C. magnetic field applying means is a radio frequency transmitter, and said modulating means for producing a simulated resonance signal is an amplitude modulator modulating said radio frequency transmitter signal for producing an audio modulation sideband constituting the simulated resonance signal.

5. The apparatus of claim 2 wherein said modulating means for producing the simulated resonance signal modulates the signal derived from said A.C. magnetic field applying means with a signal derived from said D.C. field modulating means at the D.C. field modulation frequency to produce a sideband constituting the simulated resonance signal.

6. The apparatus of claim 4 wherein said amplitude modulator for producing the simulated resonance signal is a diode in which the transmitter signal is amplitude modulated by a signal derived from said D.C. magnetic field modulator.

7. The apparatus of claim 6 wherein said resonance detecting means includes a radio frequency amplifier for amplifying resonance signals emanating from the gyromagnetic resonance substance, and wherein the simulated resonance signal as derived from the output of said diode modulator is injected into said radio frequency amplifier.

8. The apparatus of claim 7 wherein said D.C. magnetic field modulator is variable in frequency whereby the simulated resonance signal is tunable for testing certain filter circuits of said resonance detecting means.

9. The apparatus of claim 5 wherein said D.C. field modulation means is variable in frequency to produce a variable frequency simulated resonance test signal.

10. The apparatus of claim 7 wherein said radio frequency amplifier includes a pick-up coil structure for receiving resonance signals emanating from the resonance substance, and wherein the simulated resonance signal is injected into said receiver by being injected into said pick-up coil structure of said radio frequency amplifier.

No references cited.

RUDOLPH V. ROLINEC, *Primary Examiner.*

M. J. LYNCH, *Assistant Examiner.*